UNITED STATES PATENT OFFICE.

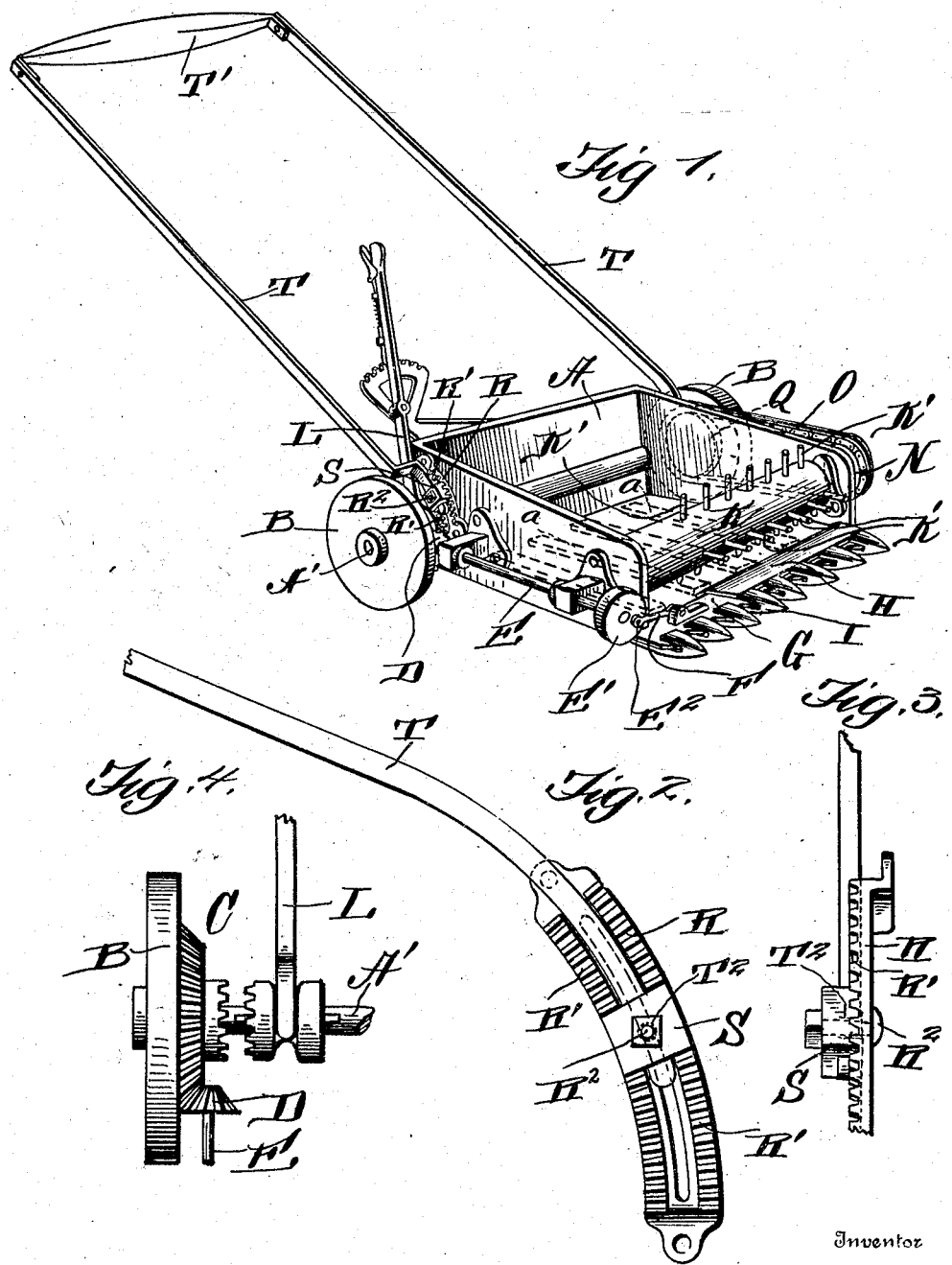

WILLIAM EDWARD HAKE, OF BRANCH, ARKANSAS, ASSIGNOR OF ONE-HALF TO JOSEPH S. COTNER, OF BRANCH, ARKANSAS.

LAWN-MOWER.

No. 911,719.

Specification of Letters Patent.

Patented Feb. 9, 1909.

Application filed August 8, 1908. Serial No. 447,617.

To all whom it may concern:

Be it known that I, WILLIAM E. HAKE, a citizen of the United States, residing at Branch, in the county of Franklin and State of Arkansas, have invented certain new and useful Improvements in Lawn-Mowers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in lawn mowers and the object in view is to produce an apparatus of this nature so constructed that the grass as it is cut will be moved into a receptacle by means of a rotatable cylinder having teeth mounted thereon, and in the provision of various details of construction, combinations and arrangements of parts which will be herinafter fully described and then specifically defined in the appended claims.

My invention is illustrated in the accompanying drawings, in which:—

Figure 1 is a perspective view of my improved lawn mower, and Fig. 2 is an enlarged detail view showing the manner of adjusting the handle. Figs. 3 and 4 are detail views of parts of the apparatus.

Reference now being had to the details of the drawings by letter, A designates a box or receptacle having reinforcing ribs a upon the bottom thereof. A driving shaft A' is journaled in suitable bearings in said receptacle and wheels B are mounted upon said shaft, one of said wheels being provided with gear teeth C upon the inner face thereof which are in mesh with the teeth of the pinion wheel D mounted upon the shaft E which is journaled in suitable bearings on the side of the box. Fixed to said shaft E is a disk E' having an eccentrically mounted pin E² thereon which is pivotally connected to a link F which in turn is pivotally connected to the cutter bar G of the usual construction employed upon reciprocating mowers. Above said cutter is a strip H between which and the guard I said bar is adapted to reciprocate.

Mounted adjacent to the sickle bar and in the side walls of said box is a cylinder K having teeth K' radiating from the circumference thereof, said teeth being adapted to rake or move the grass as it falls upon said strip after being cut back into the box or receptacle. A sprocket wheel N is fixed to the spindle end of said cylinder and a sprocket chain O passes about the sprocket wheel N and also about a sprocket wheel Q which is fixed to the shaft A' whereby the cylinder may be rotated.

A suitable clutch mechanism operated by the lever L is pivotally mounted upon the box and is so arranged that the gear wheel, which meshes with the teeth upon the wheel B, may be thrown into or out of gear. Secured to the opposite side walls of the box are the segment plates R, each of which has two series of gear teeth R', and S designates a segment plate having a series of teeth adapted to engage the teeth of the segment plate R and to be adjustably mounted thereon and held in an adjusted position by means of a bolt R² passing through an aperture in the segment plate and also a retaining nut, as shown clearly in the drawings. A suitable handle, comprising the bars T with a cross-piece T' at one end, said bars of the handle being curved at corresponding ends and apertured as at T² for the reception of bolts designed to pass through apertures in the handle and said adjustment segment plate, whereby the handles may be lengthened or shortened accordingly as may be desired.

In operation, motion is imparted to the cutter bar by the connections shown and, as the grass is cut, the pins upon said cylinder will rake the grass back into the box which forms a receptacle for holding the same, thus dispensing with the necessity of having to rake up grass which falls upon the ground after being cut.

By the provision of the handles mounted as shown and described, the latter may be conveniently and quickly adjusted as may be desired.

What I claim to be new is:—

1. A lawn mower comprising a grass receiving receptacle, a driving shaft journaled therein, handles adjustably fastened to the side walls of said box, wheels fixed to said shaft, gear teeth upon one of said wheels, a shaft journaled upon the receptacle at right angles to the driving shaft and adapted to be driven by said gear teeth, a reciprocating cutter bar adapted to be driven by said shafts, a cylinder journaled in bearings in the side walls of said receptacle adjacent to the cutter bar, pins projecting from said cylinder and adapted to rake grass as it is cut back into the receptacle, and means for rotating said cylinder, as set forth.

2. A lawn mower comprising a grass receiving receptacle, a driving shaft journaled therein, handles adjustably fastened to the side walls of said box, wheels fixed to said shaft, gear teeth upon one of said wheels, a shaft journaled upon the receptacle at right angles to the driving shaft and adapted to be driven by said gear teeth, a reciprocating cutter bar adapted to be driven by said shafts, a strip projecting forward from the receptacle and extending over the cutter bar, a cylinder journaled in the side walls of the receptacle adjacent to the cutter bar, pins projecting from said cylinder and adapted to rake the grass as it is cut back into said receptacle, and means for rotating said cylinder, as set forth.

3. A lawn mower comprising a grass receiving receptacle, a driving shaft journaled therein, segment gear plates secured to the side walls of said box, each of said plates having a slot therein, an adjustable toothed segment block having teeth adapted to mesh with the teeth of the segment plates upon said receptacle, a handle having apertures in the bars thereof, fastening means passing through the apertures of the handle and said adjustable segment plates whereby the handles may be held in adjusted positions, as set forth.

In testimony whereof I hereunto affix my signature in the presence of two witnesses.

WILLIAM EDWARD HAKE.

Witnesses:
 TOM. ESTES,
 J. L. BAKER.